(12) United States Patent
Keppler et al.

(10) Patent No.: US 12,703,389 B2
(45) Date of Patent: Aug. 11, 2026

(54) METHOD FOR DETERMINING A NAVIGATION ROUTE FOR AN AUTOMATED DRIVING OPERATION OF A VEHICLE

(71) Applicant: MERCEDES-BENZ GROUP AG, Stuttgart (DE)

(72) Inventors: Martin Keppler, Oberreichenbach (DE); Tobias Mahler, Ostelsheim (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 24 days.

(21) Appl. No.: 18/850,000

(22) PCT Filed: Dec. 16, 2022

(86) PCT No.: PCT/EP2022/086422
§ 371 (c)(1),
(2) Date: Sep. 23, 2024

(87) PCT Pub. No.: WO2023/179903
PCT Pub. Date: Sep. 28, 2023

(65) Prior Publication Data

US 2025/0206336 A1 Jun. 26, 2025

(30) Foreign Application Priority Data

Mar. 25, 2022 (DE) ..................... 10 2022 001 030.5

(51) Int. Cl.
*B60W 60/00* (2020.01)
*B60W 30/18* (2012.01)

(52) U.S. Cl.
CPC .... *B60W 60/001* (2020.02); *B60W 30/18163* (2013.01); *B60W 60/0053* (2020.02); *B60W 2552/10* (2020.02); *B60W 2556/40* (2020.02)

(58) Field of Classification Search
None
See application file for complete search history.

(56) References Cited

U.S. PATENT DOCUMENTS 10,969,232 B1 4/2021 Johnson et al.
2020/0200547 A1 6/2020 Miller et al.
(Continued)

FOREIGN PATENT DOCUMENTS

DE 102021006166 A1 3/2022
EP 3617649 A1 3/2020
(Continued)

OTHER PUBLICATIONS

International Search Report and Written Opinion mailed Apr. 11, 2023 in related/corresponding International Application No. PCT/EP2022/086422.
(Continued)

*Primary Examiner* — Abdhesh K Jha
(74) *Attorney, Agent, or Firm* — PATENT PORTFOLIO BUILDERS PLLC

(57) ABSTRACT

A navigation route for the automated driving operation is determined in a lane-specific manner. A node list is produced based on a digital attribute-based street map, the node list representing the geographical coordinates of a route determined by a navigation system. The node list is transferred into a digital sensor-based street map containing a surroundings description detected by sensors. Lane-specific driving section candidates being determined in the digital sensor-based street map using the node list. Irrelevant driving section candidates are identified and eliminated. The route is segmented into subgraphs with only one possible lane and subgraphs with multiple possible lanes. Optimal lanes are identified and combined to form the lane-specific navigation route.

16 Claims, 5 Drawing Sheets

(56) References Cited

U.S. PATENT DOCUMENTS

Figure 1:
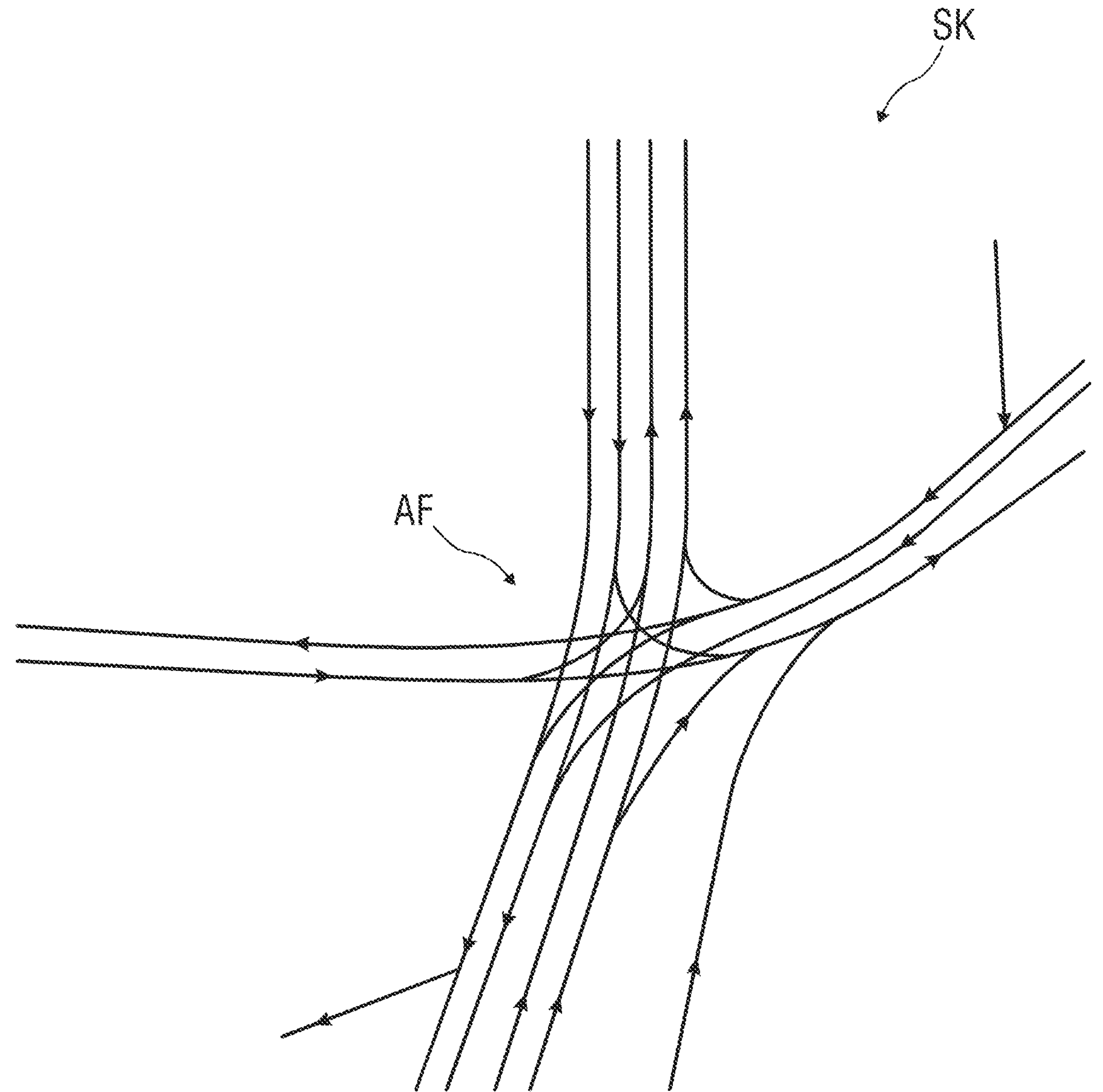

2020/0348145 A1 11/2020 Paranjpe et al.
2021/0269056 A1* 9/2021 Zhu ...................... G05D 1/0212
2022/0032907 A1 2/2022 Itoh
2022/0065644 A1 3/2022 Kundu et al.

FOREIGN PATENT DOCUMENTS

WO 2019180963 A1 9/2019
WO 2019202881 A1 10/2019
WO 2020110792 A1 6/2020
WO WO-2020214596 A1 * 10/2020 ......... G01C 21/3815
WO 2021106295 A1 6/2021
WO 2021192054 A1 9/2021
WO 2021256439 A1 12/2021

OTHER PUBLICATIONS

Office Action created Nov. 8, 2022 in related/corresponding DE Application No. 10 2022 001 030.5.
Office Action dated Oct. 21, 2025 in related/corresponding JP Application No. 2024-556502.

* cited by examiner

METHOD FOR DETERMINING A NAVIGATION ROUTE FOR AN AUTOMATED DRIVING OPERATION OF A VEHICLE

BACKGROUND AND SUMMARY OF THE INVENTION

Exemplary embodiments of the invention relate to a method for determining a navigation route for an automated driving operation of a vehicle.

It is generally known from the prior art to specify a destination for a navigation system of a vehicle capable of automated driving. The navigation system determines a navigation route to the specified destination. If it is possible, the vehicle drives along at least some sections of the determined navigation route in the automated driving operation.

Aligning street maps, coming from different sources, with standard definition (SD street maps) and high definition (HD street maps) is described in U.S. Pat. No. 10,969,232 B1. As a response to the input of a destination, a route to this destination is defined and SD street map waypoints are generated from this defined route. A graph is generated from the HD street map. The waypoints are compared to the nodes and edges in the graphs. One or more edges form a segment in the HD street map. Multiple segments are identified to correspond to the route.

A method for data transfer between two digital street maps is described in DE 102021006166.7. The data transfer is carried out between a digital sensor-based street map and a digital attribute-based street map, wherein a segmentation of the sensor-based street map into junctions and route sections is carried out, attributes of automated driving are assigned to the route sections, attributes of automated driving are assigned to junction segments, and it is checked whether an attribute value for an automated crossing in a junction area can be reconciled with turning restrictions in the attribute-based street map.

A device and a method for managing a vehicle driving on a street along a route is known from US 2022/0 032 907 A1, in which the surroundings of the street being navigated by the vehicle are detected by means of sensors arranged in the surroundings, and in which map information about the street being navigated is detected, wherein based on the detected surroundings and the detected map information, information about a driving speed of the vehicle on the route or about the navigability of the route is determined and is transferred to the vehicle.

US 2020/0 200 547 A1 discloses a method for generating navigable boundaries of a road stored in a high definition three-dimensional map as a three-dimensional representation. With the method, a two-dimensional projection of the street is generated, wherein the projection comprises a plurality of points along the street. Each of these points is evaluated with regards to its navigability and based hereon, a navigable surface and the boundaries thereof is determined in the projection of the street. The determined navigable surface and the boundaries thereof are then converted into a three-dimensional representation and used to update the three-dimensional map.

Exemplary embodiments of the invention are directed to a method for determining a navigation route for an automated driving operation of a vehicle that is improved in relation to the prior art.

In a method according to the invention for determining a navigation route for an automated driving operation of a vehicle, it is provided that the navigation route for the automated, in particular highly automated or autonomous, driving operation is determined in a lane-specific manner. This is carried out in the following manner: based on a digital attribute-based street map, a node list is produced representing the geographical coordinates of a route determined by a navigation system. The node list is transferred into a digital sensor-based street map, which contains a surroundings description detected by sensors. Lane-specific driving section candidates are determined in the digital sensor-based street map using the node list. Irrelevant driving section candidates are identified and eliminated. The route is segmented into subgraphs with only one possible lane and subgraphs with multiple possible lanes. In subgraphs with only one possible lane, a relevant lane-specific driving section candidate exists on only one lane. In subgraphs with several possible lanes, there are relevant lane-specific driving section candidates on several lanes. Optimal lanes are identified. In the subgraphs with only one possible lane, this lane is identified as being an optimal lane. In the subgraphs with several possible lanes, one of the lanes is selected as being an optimal lane. The optimal lanes are combined to form the sought-after lane-specific navigation route.

The method according to the invention uses the route determined by the navigation system, which is based in particular on edges and/or nodes, to determine a lane-specific driving path in the form of the lane-specific navigation route which is optimal from the point of view of the digital sensor-based street map, i.e., a lane-defined driving path that can be navigated as automatically as possible, which route the vehicle can follow optimally in automated driving operation. This driving path, i.e., the lane-specific navigation route, in the digital sensor-based street map corresponds as well as possible to the driving path, i.e., the route, from the digital attribute-based street map. Using this driving path, i.e., the lane-specific navigation route, the vehicle can then drive automatically, at least along the driving sections of the navigation route that can be navigated automatically, i.e., along sections of the navigation route for which lane-specific driving section candidates could be determined, initiate a transfer of vehicle guidance to a vehicle driver or a takeover of vehicle guidance from the vehicle driver in good time and, for driving portions of the navigation route that cannot be navigated automatically, i.e., for sections of the navigation route for which no lane-specific driving section candidates could be determined enable manual driving, in particular based on driving recommendations made by the navigation system.

In one possible embodiment, sections of the navigation route for which no lane-specific driving section candidates could be determined are blocked for the automated driving operation. In one possible embodiment, sections of the navigation route for which lane-specific driving section candidates could be determined, are released for the automated driving operation. In one possible embodiment, the highly automated or autonomous driving operation is only permitted on released sections. This ensures that the automated, in particular highly automated or autonomous, driving operation is only carried out on the sections of the navigation route which are suitable for this.

In one possible embodiment, in the highly automated or autonomous driving operation, before reaching a blocked section, a takeover request is issued to a vehicle driver of the vehicle. Therefore, the vehicle driver can take over control of the vehicle in time, whereby an uninterrupted driving operation is made possible and unsafe situations are avoided.

In one possible embodiment, an alternative lane-specific navigation route without or with fewer sections that are blocked for the automated driving operation is sought if the lane-specific navigation route found contains one or more sections that are blocked for the automated driving operation. This ensures that the navigation route is found that has no or at least the fewest sections blocked for automated driving, so that it is possible to drive from the start to the destination or at least the greatest possible distance in automated driving mode.

In one possible embodiment, for the subgraphs with multiple possible lanes, the optimal lanes are identified by means of a cost function. In particular, costs are assigned to the lanes of the respective subgraph with several possible lanes, the amount of which depends in particular on the suitability of the respective lane for automated driving operation, in particular also on the degree of automated driving operation, i.e., in particular on the SAE level, i.e., on the automation level of the driving operation. The lower the SAE level, the greater the assigned costs. Alternatively, or additionally, required lane changes can also be incorporated in this assessment. The optimal lanes are thus identified by minimizing these costs. As an alternative to this cost function, the contrary approach is also possible, i.e., the identification of the optimal lanes by means of a bonus function. As a result, the bonuses are assigned in a reverse manner to the assignment of the costs. In the example of the SAE level, the higher the SAE level, the greater the associated bonus. Alternatively, or additionally, required lane changes can be incorporated in this assessment in this case as well. The optimal lanes are then identified by maximizing the bonus.

The assessment with costs or bonuses can be weighted, for example. Alternatively, for example, machine-learning can be carried out using training data, which then performs the assessment, for example by means of a neural network.

In one possible embodiment, depending on the lane-specific navigation route, a lane change recommendation is produced for carrying out an automated or manual lane change for the purpose of following the lane-specific navigation route.

The lane change recommendation for carrying out the automated lane change is preferably produced in the highly automated or autonomous driving operation and is output to a device for carrying out the highly automated or autonomous driving operation.

The lane change recommendation for carrying out a manual lane change is produced, in particular, for a vehicle that is not designed for carrying out automated lane changes and is issued to a vehicle driver of the vehicle. The vehicle driver can therefore be issued with this recommendation in the highly automated or autonomous driving operation or in a manual driving operation. Issuing the recommendation in the manual driving operation is advantageous because the vehicle driver is then guided to the optimal lane for the lane-specific navigation route in preparation for a subsequent highly automated or autonomous driving operation.

The method improves the driving experience of a highly automated or autonomous journey by planning lane changes to the optimal lanes in advance and carrying them out automatically or recommending them to the vehicle driver, whereby unexpected interruptions to the highly automated or autonomous driving operation due to lane sections lying ahead which are unsuitable for this driving operation are avoided as much as possible.

The features mentioned for the method for determining a navigation route for the automated driving operation of the vehicle can, individually or in combination with each other, also be part of a method for carrying out a driving operation of the vehicle, in particular for carrying out an automated, in particular highly automated or autonomous, driving operation of the vehicle.

BRIEF DESCRIPTION OF THE DRAWING FIGURES

Exemplary embodiments of the invention are explained in more detail in the following using the drawings.

Figure 2:
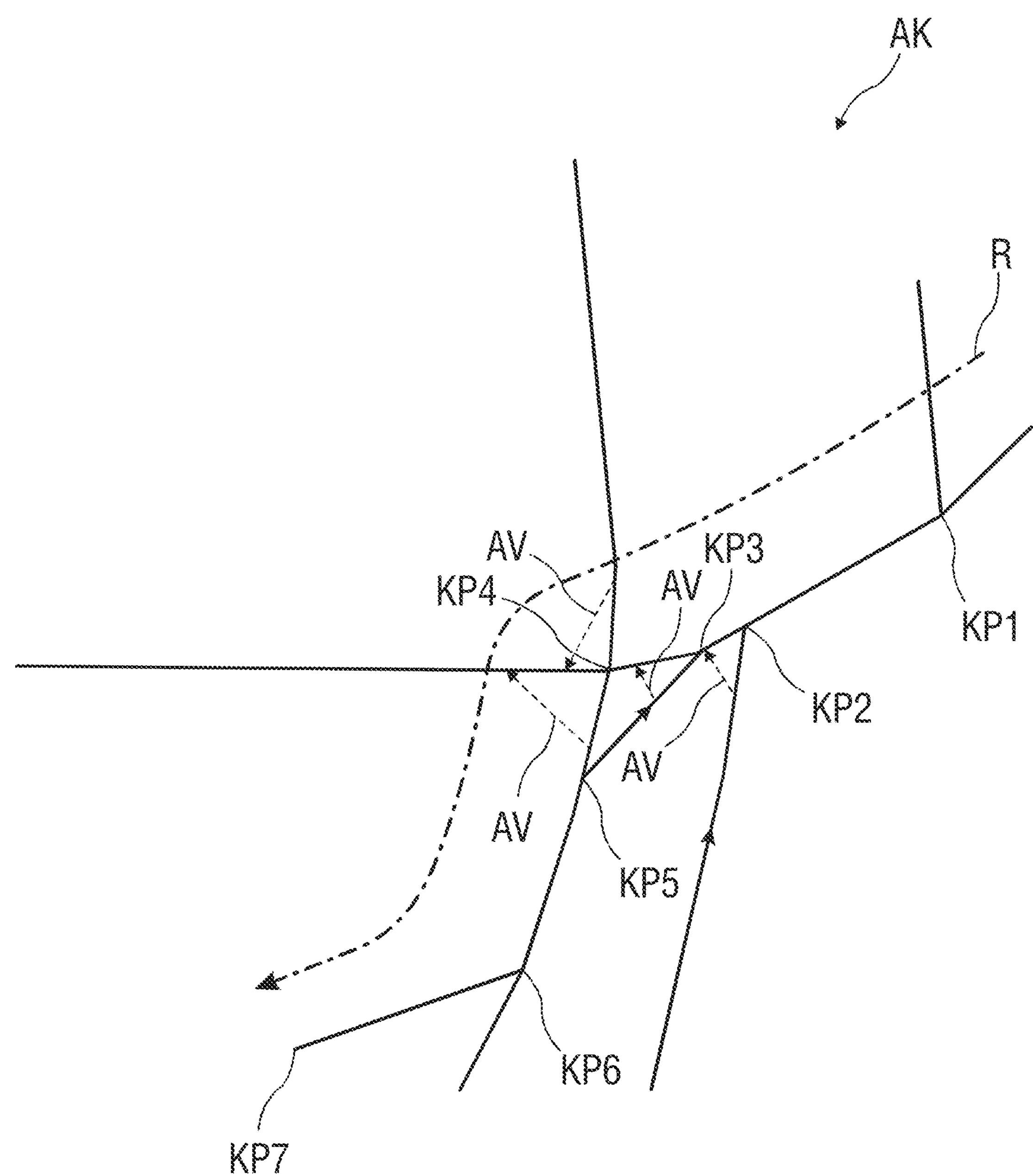
Figure 3:
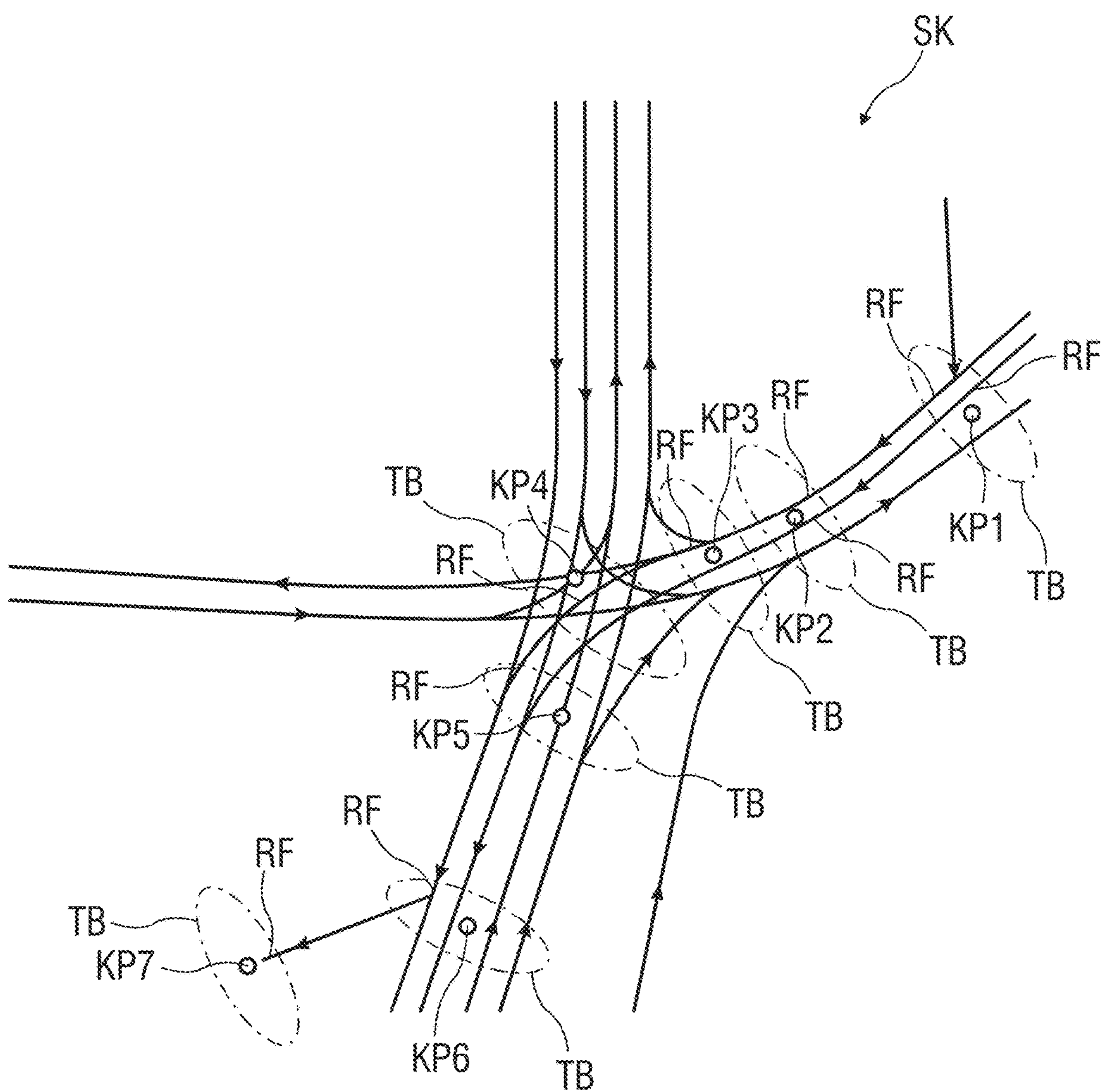
Figure 4:
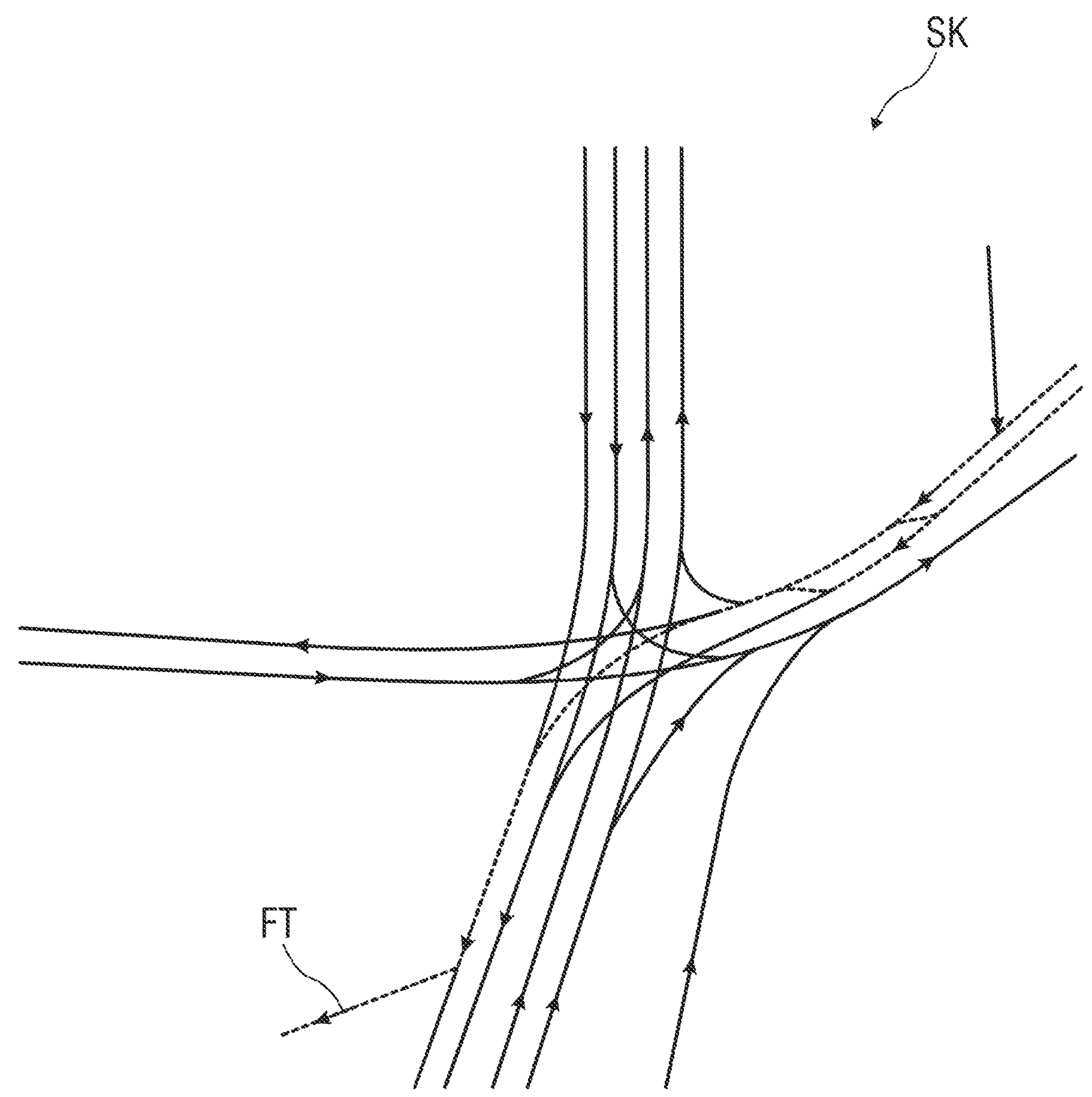
Figure 5:
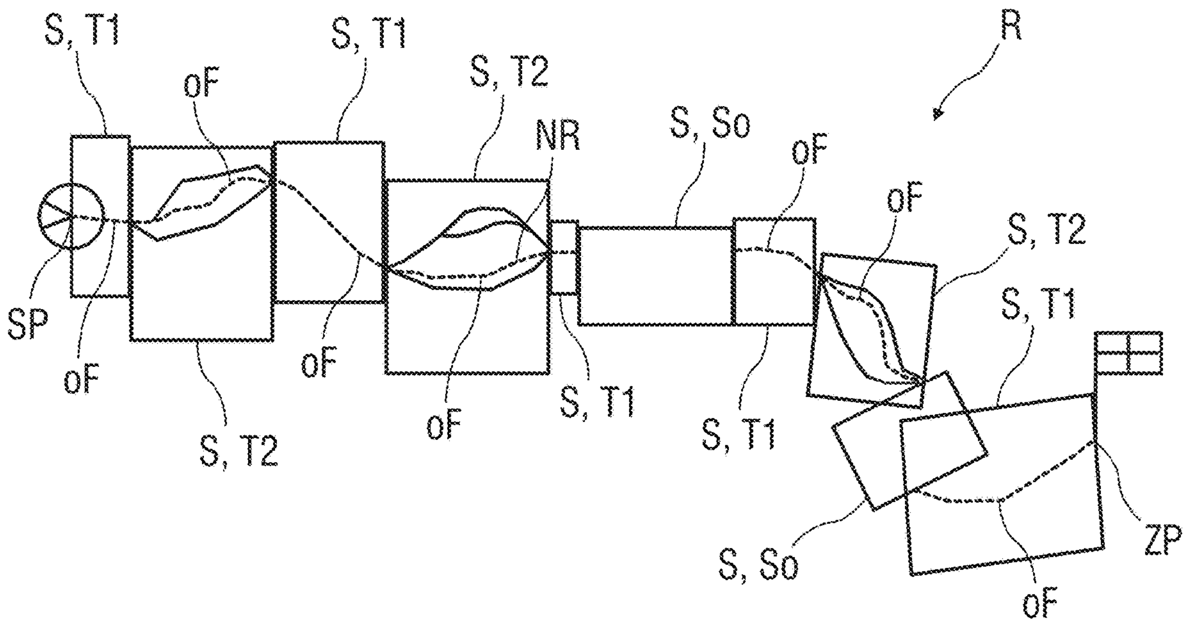

Here:

FIG. 1 schematically shows a digital sensor-based street map,

FIG. 2 schematically shows a digital attribute-based street map,

FIG. 3 schematically shows the digital sensor-based street map from FIG. 1 with geographical coordinates transferred from the digital attribute-based street map according to FIG. 2, FIG. 4 schematically shows the digital sensor-based street map from FIG. 1 with possible driving trajectories which result from determined relevant driving section candidates, and FIG. 5 schematically shows segmentation into subgraphs and determination of a lane-specific navigation route.

Parts corresponding to each other are provided with the same reference signs in all the figures.

DETAILED DESCRIPTION

With reference to FIGS. 1 to 5, a method for lane-specific determination of a navigation route for an automated, in particular highly automated or autonomous, driving operation of a vehicle is described in the following.

In the prior art, automated driving is being further developed, in particular by means of data-driven approaches. In this case, vehicles are equipped with extensive sensors that investigate different aspects of a vehicle's surroundings and thus provide surroundings data. Here, for example, radars, lidars, cameras, and/or ultrasound, and/or other sensor technologies suitable for surroundings detection are used as sensor technologies. By means of this surroundings data, in particular using machine-learning methods, a model of the environment is produced. The vehicle to be driven automatically is introduced into this model, hypotheses are created by projecting movements into the future, and possible courses of action for automated vehicle control are then determined therefrom and implemented.

To check the plausibility of a position estimate of the vehicle to be driven in automated mode, to check the plausibility of the modelling and ultimately also to check the plausibility of the possible courses of action, it is state of the art for safety reasons not only to rely on the vehicle's own current sensor data, but also to use sensor data from the past.

This sensor data from past journeys of ideally several different vehicles is abstracted, in particular, using machine-learning methods and accumulated in a digital sensor-based street map SK, as shown as an example in FIG. 1. This sensor-based street map SK describes lane-specific driving path segments recorded in the past and an image of the environment found from the perspective of the accumulated sensor data. This is therefore a sensor-based street map SK learnt by vehicles using sensor technology.

A navigation system, on the other hand, requires a digital attribute-based street map AK, shown as an example in FIG. 2. This attribute-based street map AK serves a completely different purpose to the sensor-based street map SK. The attribute-based street map AK is primarily used for calculating routes from the current position of the vehicle to the specified destination. The attribute-based street map AK therefore also has fundamentally different characteristics to the sensor-based street map SK.

The attribute-based street map AK is significantly more abstract, otherwise it would not be possible to calculate routes efficiently on a navigation system embedded in the vehicle. In addition, the attribute-based street map AK consists at least of edges, also known as links or street segments, nodes, also known as nodes or connections between links or junctions, and relations. Relations are relationships and conditions between edges, for example turning restrictions AV.

The attribute-based street map AK has many attributes that are difficult or impossible to detect automatically using sensors. Examples include street names, road types, points of interest, house numbers, or also specific restrictions at complex junctions, such as vehicle-based and/or time-based turning restrictions AV.

In particular, the attribute-based street map AK and the sensor-based street map SK differ with regard to three central aspects described below:

The attribute-based street map AK describes a road network according to a predefined set of rules that is optimized to enable navigation functions efficiently. In contrast, the sensor-based street map SK describes an environment in the way in which it is observed and measured by sensors.

The attribute-based street map AK describes the geometry at street level, i.e., an edge-based geometry, as shown in FIG. 2. In contrast, the sensor-based street map SK describes the geometry at lane level, i.e., a lane-based geometry, as shown in FIG. 1, in which the sensor-based street map SK is shown with the lanes. The difference is particularly evident at complex junctions, as can be seen in the comparison of FIGS. 1 and 2 for such a complex junction.

The attribute-based street map AK describes turning restrictions AV. In contrast, the sensor-based street map SK models turning options by means of the presence of a dedicated turning lane.

In the sensor-based street map SK according to FIG. 1, all turning and driving options AF at the junction are illustrated. In the attribute-based street map AK according to FIG. 2, turning restrictions AV at the junction are illustrated by means of dashed arrows. The difference in the abstraction is clear.

The sensor-based street map SK contains information for the automated driving operation. The attribute-based street map AK allows route calculation and route guidance, for example for a navigation system.

Accordingly, DE 102021006166.7 describes, in particular with reference to FIGS. 1 to 5 and in the associated figure description, a matching method that makes it possible to map the information from the sensor-based street map onto the significantly more abstract attribute-based street map. DE 102021006166.7, in particular FIGS. 1 to 5 and the description of the figures, are hereby incorporated by reference.

The method described below makes it possible in particular to map, in a way that is suitable for carrying out the automated, in particular highly automated or autonomous, driving operation and in particular in an optimized manner, a route R from a starting point SP to a destination point ZP on the digital sensor-based street map SK that has been determined by means of a navigation system using the digital attribute-based street map AK, in order to be able to drive along said route by means of the vehicle, in particular in an automated, in particular highly automated or autonomous, manner.

An entire system, on which this mapping is implemented, consists, in particular, of a vehicle having a device for carrying out the automated, in particular highly automated or autonomous, driving operation based on a digital sensor-based street map SK and a navigation system having a digital attribute-based street map AK. The navigation system can therefore be implemented in the vehicle with a local database or be provided as a backend-based online solution, i.e., with a data connection of the vehicle to a server external to the vehicle, or a combination of these two embodiments can be provided.

In the method described here, in particular in a step I, a node list representing the geographical coordinates KP1 to KP7 of the route R determined by the navigation system is produced based on the digital attribute-based street map AK. The geographical coordinates KP1 to KP7 are also referred to as nodes.

First, the route R is calculated in the navigation system. This route R or a desired, in particular predictive, driving path is advantageously transferred to the device for carrying out the automated, in particular highly automated or autonomous, driving operation, in order to allow the vehicle to follow the route R or the driving path with the highest possible automation level (SAE level). In the following, the method is described using the route R determined by means of the navigation system, wherein the driving path can be used as an alternative to the route R.

In particular, the route R determined by the navigation system is initially available, especially within the navigation system, as a directed list (sequence) of edges and/or nodes in the map graph of the attribute-based street map AK. The list typically consists of alphanumerical or numerical IDs, i.e. identification codes (references) to the edges/nodes in the map graphs. All of the edges and/or nodes are included in full.

In particular, in a substep I.1, a mapping to a list that only contains nodes takes place, since a geometric progression of the route R is completely and unambiguously contained in the complete node list. This is the information with which the mapping to the sensor-based street map SK can take place.

If a route list of the route R, determined by means of the navigation system, consists of edges and nodes, it is, in particular, provided that all of the edges are removed from the route list. Therefore, it contains a complete list of only the nodes along the route R.

If the route list of the route R, determined by means of the navigation system, only consists of edges, it is, in particular, provided that in the map graph, for each edge, the respective starting and end node is sought. The complete list of the edges is replaced by the complete list of the nodes along the route R.

In particular, in a substep I.2, a mapping of the node list to a common exchange format takes place because the referencing in the node list along the route R take place by means of the aforementioned IDs. These IDs are, however, not known in the sensor-based street map SK. Therefore, mapping to a common exchange format known on both sides is carried out.

The IDs of the complete list of the nodes along the route R are replaced by a data set of an exchange format known equally in both street maps AK, SK. For example, the geo-coordinates may be in the format WGS84, optionally also enriched with further data, for example elevation information or street names or street numbers.

Furthermore, in the method described here, in particular in a step II, the node list, in particular in the common exchange format, is transferred into the digital sensor-based street map SK containing a description of the surroundings detected by sensors.

For example, the node list of the route R is transferred in the common exchange format to a computing unit, which has access to the sensor-based street map SK and carries out the mapping, i.e., matching, to the sensor-based street map SK.

FIG. 2 shows the complete node list of the route R with the nodes, i.e., the geographical coordinates KP1 to KP7 in the attribute-based street map AK.

FIG. 3 shows the complete node list of the route R mapped by means of the common exchange format to the sensor-based street map SK. Due to the generalized character of the attribute-based street map AK, the geographical coordinates KP1 to KP7 deviate in some cases far from the actual lane-specific driving paths of the sensor-based street map SK and thus from a possible lane-specific navigation route NR.

Furthermore, in the method described here, in particular in a step III, lane-specific driving section candidates are determined in the digital sensor-based street map SK using the node list.

Due to the significant deviation, described above and obvious in comparison to FIGS. 2 and 3, in the geometric representation between the two street maps AK, SK, it is, in particular, provided that the nodes, i.e., geographical coordinates KP1 to KP7, adopted from the attribute-based street map AK into the sensor-based street map SK are provided with a tolerance range TB. The respective tolerance range TB can, for example, be greater in the transverse direction, i.e., transverse to a driving direction of the vehicle, than in the driving direction.

All lane-specific lane driving sections that are located inside the respective tolerance range TB are candidates for the lane sections to be used, i.e., the lane-specific driving section candidates. If there are no lane-specific driving sections in the sensor-based street map SK for a few consecutive nodes, i.e., geographical coordinates KP1 to KP7, within the tolerance range TB, a small-scale deviation between the two street maps AK, SK can be assumed. In this case, these few individual nodes, i.e., geographical coordinates KP1 to KP7, can be skipped. If there are no lane-specific driving sections in the sensor-based map SK for a sufficient number of consecutive nodes, i.e., geographical coordinates KP1 to KP7, within the tolerance range TB, it can be assumed that no automated driving operation is possible within this section along the nodes, i.e., the geographical coordinates KP1 to KP7. The further process for this case is then described below in step V.

Furthermore, in the method described here, in particular in a step IV, irrelevant, i.e., in particular implausible, driving section candidates are identified and eliminated, i.e., discarded. Therefore, the relevant driving section candidates RF remain.

In particular, in a substep IV.1, driving section candidates having a driving direction contrary to the progress of the route R are discarded i.e., eliminated. Driving section candidates leading away from the route R in the further progress, in particular those which ultimately leave it, are discarded, i.e., eliminated. Driving section candidates leading into the route R from outside, i.e., beyond it, are discarded, i.e., eliminated. Driving section candidates that are not a part of the route R, but, for example, only pass nearby, are similarly discarded, i.e., eliminated.

In particular, in a substep IV.1, dead ends are eliminated. Driving section candidates corresponding to the driving course, i.e., the route R, but no longer allow route R to be followed are retroactively eliminated until a point is reached that allows a lane change to an alternative driving section that follows route R further on. This is, for example, a retroactive next point with a dashed lane marking, which thus enables a lane change. The reverse procedure, i.e., mirrored, is also used for driving section candidates that run parallel due to the previous history but can only be reached from a certain point in the direction of travel by changing lanes along route R. In the example shown, it is only possible to change from the left-hand lane in the direction of travel along route R to the right-hand lane in the direction of travel along route R up to the third geographical coordinate KP3. From the third geographical coordinate KP3 onwards, the driving sections of the left-hand lane in the direction of travel along route R are therefore not relevant driving section candidates RF.

As shown in FIG. 4, the remaining relevant driving section candidates RF allow a travel trajectory FT or several travel trajectories FT for the vehicle, shown dashed in the example shown, either directly on the right-hand lane or at the beginning on the left-hand lane with a change to the right-hand lane, as long as this is still permitted.

Furthermore, in the method described here, in particular in a step V, the route R is segmented into subgraphs T1 with only one possible lane and subgraphs T2 with multiple possible lanes. This is shown as an example in FIG. 5 for the entire route R from the starting point SP to the destination point ZP. The different segments S are marked by boxes in this figure.

As shown, segments So can also be present without possible subgraphs. The sought-after lane-specific navigation route NR for the automated, in particular highly automated or autonomous, driving operation has a gap in such a segment So. In this segment So, automated driving is not possible. The section of the navigation route in such a segment So without possible subgraphs, for which no lane-specific driving section candidates could thus be determined, is blocked for automated driving operation, for example SAE levels 3, 4 and 5, i.e., not released at least for highly automated and autonomous driving. In the highly automated or autonomous driving operation, vehicle guidance must be handed over to a vehicle driver of the vehicle driver before reaching the blocked section. Thus, before reaching the blocked section, a takeover request is issued to the vehicle driver of the vehicle.

In the example shown, fully automated or autonomous driving is not possible on the entire route R, as the vehicle must reach the destination, i.e., the destination point ZP of route R, without a driver during the fully automated or autonomous driving operation, and this is not possible if the driving task has to be handed over to a vehicle driver in the meantime. If the vehicle is to drive in fully automated or autonomous driving operation, the route R is discarded, and a search is made for an alternative route R that has no segments So without possible subgraphs.

In the segmentation method step, as described above in particular step V, the graph with all possible trajectories along the route R is thus segmented into subgraphs T1 with only one possible lane, i.e., here a relevant lane-specific driving section candidate RF only exists on one lane, and subgraphs T2 with multiple possible lanes, i.e., here relevant lane-specific driving section candidates RF exist on several lanes.

Sections of the route R that cannot be mapped onto the sensor-based street map SK, i.e., where an automated driving operation is not possible, are handled separately, as explained above in step III. As already explained, here an automated driving operation is not possible, such that before reaching the section, the vehicle driver takes over. Once such a section has come to an end, the automated driving can take over again, i.e., the automated driving operation is activated again. Alternatively, a method for carrying out the automated driving operation without a sensor-based street map SK can be used, which makes the automated driving operation possible in these segments So without possible subgraphs, without handing over to the vehicle driver.

Furthermore, in the method described here, in particular in a step VI, optimal lanes oF are identified. In the subgraphs T1 with only one possible lane, this is the optimal lane oF since there is no alternative to carry out the automated driving operation. The vehicle must then keep to this lane. In the subgraphs T2 with multiple possible lanes, one must be selected as an optimal lane oF in order to generate a lane-specific navigation route NR. The selection takes into account, for example, on which of the possible lanes it is possible to drive with the highest possible proportion of the highest possible automation level, i.e., SAE level, with as few lane changes as possible, with as few and/or minor disturbances as possible, which require as few and/or minor speed adjustments as possible.

The selection of the optimal lane oF in the subgraph T2 with multiple possible lanes is thus carried out, in particular, by considering the result of an assessment, for example by means of a cost function. The lane with the optimal, i.e., minimal, costs is selected as an optimal lane oF and thus used to allow the vehicle to drive automatically along the subgraph T2. Lane changes along the subgraphs T2 are also considered in this case, as long as the corresponding data of the sensor-based street map SK allows a lane change. The cost function can comprise one or more or all of the following parameters, which are included in the cost function according to their length proportion along the route R for example:

- The costs sink with increasing automation levels (SAE levels) of the automated driving. The level of the automated driving is an attribute of the sensor-based street map SK, individual sections can have different automation levels.
- The costs sink with an increasing proportion of the automated driving operation.
- The costs increase with the required number of handovers between the vehicle driver and the automated driving operation. Conversely, the costs therefore sink, the longer the individual sections of the automated driving operation are connected.
- The costs increase with the number of lane changes to carried out.
- The costs increase according to current traffic delays, for example determined from lane-specific traffic information.
- The costs sink according to the actual lane-specific driving speeds that can be determined in particular by means of a sensor system.

The individual cost parameters can, for example, be weighed against each other, in particular corresponding to a system design, and be transferred into a common overall cost function which considers all of the sub-parameters accordingly.

As an alternative to this cost model of assessment, which adds up disadvantageous costs and then minimizes them overall, bonus values can also be calculated in reverse, which are then maximized. In the above-mentioned points where the costs sink, the bonus values would then increase, and in the above-mentioned points where the costs increase, the bonus values would then sink. Also here, the individual bonus parameters can then, for example, be weighed against each other, in particular corresponding to a system design, and be transferred into a common overall bonus function which considers all of the sub-parameters accordingly. The difference is that with the cost function, the costs are minimized and with the bonus function, the bonus values are maximized As an alternative to the weighted assessment of the individual arguments, in particular of the above-mentioned parameters, machine learning can be carried out using training data, for example, which then performs the assessment using a neural network, for example.

Furthermore, in the method described here, in particular in a step VII, the identified optimal lanes oF are combined to form the sought-after lane-specific navigation route NR, i.e., to form a reconstructed, automated, navigable optimal driving path oF in the sensor-based street map SK. The lane-specific navigation route NR is shown in FIG. 5 by a dashed line. The lanes of the subgraphs T1 with only one possible lane, which is therefore the optimal lane oF, are combined with subgraphs with the respective optimal lane oF, identified in the manner described above, of the subgraphs T2 with multiple possible lanes to form an overall graph. If the overall graph has one or more gaps, in the example shown in the sixth and ninth segment S in the direction of travel, no automated driving operation is possible there based on the data of the sensor-based street map SK. Then a handover to the vehicle driver has to take place or an alternative route R must be requested in the navigation system. This means that an alternative lane-specific navigation route NR without sections blocked for automated driving or with fewer sections blocked for automated driving can be searched for.

Since the lane-specific navigation route NR is composed of a sequence of optimal lanes oF, it is possible to produce lane change recommendations that guide the vehicle to the respective optimal lane oF when following the lane-specific navigation route NR. The lane recommendations can be control instructions issued in automated or highly automated driving mode to a device for carrying out the automated or highly automated driving mode and that initiate the execution of the automated lane change. The lane recommendations can also be action instructions issued to the vehicle driver in order to instruct said vehicle driver to carry out the lane change manually. This is particularly useful for a vehicle that is not designed to carry out automated lane changes. The lane change recommendations can be issued to the driver in the highly automated or autonomous driving operation or also in a manual driving operation. Issuing the lane change recommendations in the manual driving operation is advantageous because the vehicle driver is then guided from the start into the optimal lane oF in preparation for possibly subsequent highly automated or autonomous driving operation.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for determining a lane-specific navigation route for an automated driving operation of a vehicle, the method comprising:

producing, based on a digital attribute-based street map, a node list representing geographical coordinates of a route determined by a navigation system;

transferring the node list into a digital sensor-based street map containing a surroundings description detected by sensors;

determining, using the node list, lane-specific driving section candidates in the digital sensor-based street map;

identifying and discarding irrelevant driving section candidates;

segmenting the route into subgraphs with only one possible lane and subgraphs with multiple possible lanes;

identifying optimal lanes; and combining the optimal lanes to form the lane-specific navigation route.

2. The method of claim 1, wherein sections of the lane-specific navigation route for which no lane-specific driving section candidates could be determined are blocked for the automated driving operation.

3. The method of claim 1, wherein sections of the lane-specific navigation route for which lane-specific driving section candidates could be determined are released for the automated driving operation.

4. The method of claim 3, wherein the automated driving operation is a highly automated or autonomous driving operation that is only permitted on released sections.

5. The method of claim 4, wherein the automated driving operation is a highly automated or autonomous driving operation, the method further comprising:

issuing a takeover request to a vehicle driver of the vehicle before reaching a blocked section of the lane-specific navigation route.

6. The method of claim 2, wherein an alternative lane-specific navigation route without blocked sections or with fewer blocked sections is determined if the lane-specific navigation route contains one or more blocked sections.

7. The method of claim 1, wherein for the subgraphs with multiple possible lanes, the optimal lanes are identified using a cost function.

8. The method of claim 1, wherein depending on the lane-specific navigation route, a lane change recommendation is produced for carrying out a manual or automated lane change to follow the lane-specific navigation route.

9. A method comprising:

generating, by a navigation system of a vehicle using a digital attribute-based street map, a route between a starting point and a destination;

producing, using the digital attribute-based street map, a node list representing geographical coordinates of the route;

transferring the node list into a digital sensor-based street map containing a surroundings description detected by sensors;

determining, using the node list, lane-specific driving section candidates along the route in the digital sensor-based street map;

identifying and discarding irrelevant driving section candidates from the lane-specific driving section candidates to produce remaining lane-specific driving section candidates;

segmenting the route in the digital sensor-based street map using the remaining lane-specific driving section candidates into subgraphs with only one possible lane and subgraphs with multiple possible lanes;

identifying optimal lanes along the route using the segmented route; and combining the optimal lanes to form a lane-specific navigation route.

10. The method of claim 9, wherein sections of the lane-specific navigation route for which no lane-specific driving section candidates could be determined are blocked for automated driving operation of the vehicle.

11. The method of claim 10, wherein sections of the lane-specific navigation route for which lane-specific driving section candidates could be determined are released for automated driving operation of the vehicle.

12. The method of claim 11, wherein the automated driving operation is a highly automated or autonomous driving operation that is only permitted on released sections.

13. The method of claim 12, wherein the automated driving operation is a highly automated or autonomous driving operation, the method further comprising:

issuing a takeover request to a vehicle driver of the vehicle before reaching a blocked section of the lane-specific navigation route.

14. The method of claim 10, wherein an alternative lane-specific navigation route without blocked sections or with fewer blocked sections is determined if the lane-specific navigation route contains one or more blocked sections.

15. The method of claim 9, wherein for the subgraphs with multiple possible lanes, the optimal lanes are identified using a cost function.

16. The method of claim 9, wherein depending on the lane-specific navigation route, a lane change recommendation is produced for carrying out a manual or automated lane change to follow the lane-specific navigation route.

* * * * *